US012400027B2

(12) United States Patent
Du et al.

(10) Patent No.: US 12,400,027 B2
(45) Date of Patent: Aug. 26, 2025

(54) COMMON DATA DETERMINING METHODS, APPARATUSES, AND SYSTEMS FOR PROTECTING PRIVACY

(71) Applicant: ALIPAY (HANGZHOU) INFORMATION TECHNOLOGY CO., LTD., Zhejiang (CN)

(72) Inventors: Jian Du, Hangzhou (CN); Jinming Cui, Hangzhou (CN); Lei Zhang, Hangzhou (CN); Yufei Lu, Hangzhou (CN); Pu Duan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 295 days.

(21) Appl. No.: 18/315,197

(22) Filed: May 10, 2023

(65) Prior Publication Data

US 2023/0367902 A1    Nov. 16, 2023

(30) Foreign Application Priority Data

May 10, 2022    (CN) .......................... 202210502652.X (51) Int. Cl.
*G06F 21/62*    (2013.01)
*G06F 21/60*    (2013.01)
*G06F 21/64*    (2013.01)

(52) U.S. Cl.
CPC ........ *G06F 21/6245* (2013.01); *G06F 21/602* (2013.01); *G06F 21/64* (2013.01)

(58) Field of Classification Search
CPC .... G06F 21/602; G06F 21/6245; G06F 21/64; G06F 2218/12

(Continued)

(56) References Cited

U.S. PATENT DOCUMENTS

| 11,429,730 B2 * | 8/2022 | Blatt ....................... G06F 21/79 |
| 11,949,778 B1 * | 4/2024 | Chopra ................. H04L 9/0894 |

(Continued)

FOREIGN PATENT DOCUMENTS

| CN | 110944011 | 3/2020 |
| CN | 111741020 | 3/2020 |

(Continued)

OTHER PUBLICATIONS

NPL Search Terms (Year: 2025).*

(Continued)

*Primary Examiner* — Syed A Zaidi
(74) *Attorney, Agent, or Firm* — Fish & Richardson P.C.

(57) ABSTRACT

Methods, apparatuses, and systems for protecting privacy are described. In an example, a first party encrypts a first data set, and sends a single-encrypted full data set to a second party. The second party re-encrypts the single-encrypted full data set to obtain a double-encrypted full data set, obtains a single-encrypted sampling data set, and sends the single-encrypted sampling data set to the first party. The first party encrypts the single-encrypted sampling data set to obtain a double-encrypted sampling data set, determines an intersection of the double-encrypted full data set and the double-encrypted sampling data set, performs upsampling on a complement other than the intersection in the double-encrypted sampling data set to obtain a noise-added intersection, and sends an element index of the noise-added intersection to the second party. The second party determines related information of common data based on the element index.

20 Claims, 5 Drawing Sheets

(58) Field of Classification Search
USPC .......................................................... 726/26
See application file for complete search history.

(56) References Cited

U.S. PATENT DOCUMENTS

| | | | |
|---|---|---|---|
| 2011/0296176 A1 | 12/2011 | Ashrafi et al. | |
| 2015/0149763 A1 | 5/2015 | Kamara | |
| 2018/0068124 A1* | 3/2018 | Medvedev | ............... G06F 21/60 |
| 2019/0236287 A1* | 8/2019 | Remy | ................. G06Q 30/0254 |
| 2022/0004654 A1* | 1/2022 | Patel | ..................... G06F 21/602 |
| 2022/0200969 A1* | 6/2022 | Davey | ................. H04L 63/0428 |
| 2022/0382908 A1* | 12/2022 | Buddhavarapu | .... G06F 21/6263 |
| 2024/0259200 A1* | 8/2024 | Deshpande | ............... H04L 9/32 |

FOREIGN PATENT DOCUMENTS

| | | |
|---|---|---|
| CN | 112016632 | 12/2020 |
| CN | 112487479 | 3/2021 |
| CN | 113032840 | 3/2021 |
| CN | 113127916 | 7/2021 |
| CN | 113139534 | 7/2021 |
| CN | 113343255 | 9/2021 |

OTHER PUBLICATIONS

Yuan, "research on privacy-preserving methods in data sharing," dissertation for the degree of Doctor of Engineering, Harbin Engineering University, Computer Applied Technology, Jun. 6, 2014, 113 pages(with English abstract).

* cited by examiner

COMMON DATA DETERMINING METHODS, APPARATUSES, AND SYSTEMS FOR PROTECTING PRIVACY

CROSS-REFERENCE TO RELATED APPLICATIONS

This application claims priority to Chinese Patent Application No. 202210502652.X, filed on May 10, 2022, which is hereby incorporated by reference in its entirety.

TECHNICAL FIELD

One or more embodiments of this specification relate to the field of data security, and in particular, to common data determining methods, apparatuses, and systems for protecting privacy.

BACKGROUND

Private data intersection (PSI) allows two data holders to calculate an intersection formed by matching elements in data elements of the both parties, and does not disclose a mismatched element to each other. Due to the characteristic, PSI has been widely applied to a plurality of technical scenarios for processing private data.

A plurality of specific PSI solutions have been proposed, and are applicable to different specific scenarios. For example, in a solution, a PSI intersection result is disclosed only to a certain party. In another solution, a PSI intersection result is disclosed to both parties. In still another solution, only cryptographic PSI intermediate data that have no plaintext meaning is calculated. Such intermediate data can be used for subsequent secure calculation, but cannot be used to directly obtain a PSI intersection result. However, in some technical scenarios, the PSI intersection result needs to be calculated. However, for reasons such as privacy protection or laws and regulations, the intersection result is not allowed to explicitly disclose to either party. Faced with the technical scenario, existing PSI solutions cannot achieve desired objectives and effects.

Therefore, a new solution is expected to determine related information of common data while protecting privacy.

SUMMARY

One or more embodiments of this specification describe common data determining methods and systems. Differential privacy is introduced in a private data intersection process, so that related information of common data can be efficiently determined while protecting privacy.

According to a first aspect, a common data determining method for protecting privacy is provided, performed by a first party, and including the following: each piece of first data in a first data set held by the first party is encrypted by using a first key held by the first party, to obtain a first single-encrypted full data set, and the first single-encrypted full data set is sent to a second party; a first double-encrypted full data set and a second single-encrypted sampling data set are received from the second party, where the first double-encrypted full data set is obtained by at least re-encrypting each piece of data in the first single-encrypted full data set by using a second key of the second party, and the second single-encrypted sampling data set is obtained by the second party by performing first sampling and single-encryption based on the second key on a second data set held by the second party; the second single-encrypted sampling data set is re-encrypted by using the first key, to obtain a second double-encrypted sampling data set, and an intersection of the first double-encrypted full data set and the second double-encrypted sampling data set is determined as an original intersection; second sampling is performed on a complement other than the original intersection in the second double-encrypted sampling data set, and one or more obtained additional elements are added to the original intersection, to obtain a noise-added intersection; and an element index of the noise-added intersection is sent to the second party, so that the second party determines related information of common data.

According to a second aspect, a common data determining method for protecting privacy is provided, performed by a second party, and including the following: a first single-encrypted full data set is received from a first party, where the first single-encrypted full data set is obtained by the first party by encrypting, by using a first key, each piece of first data in a first data set held by the first party, and each piece of data in the first single-encrypted full data set is at least re-encrypted by using a second key of the second party, to obtain a first double-encrypted full data set; first sampling and single-encryption based on the second key are performed based on a second data set held by the second party, to obtain a second single-encrypted sampling data set; the first double-encrypted full data set and the second single-encrypted sampling data set are sent to the first party; an element index of a noise-added intersection is received from the first party, where the noise-added intersection is obtained by adding one or more additional elements to an original intersection, the original intersection is an intersection of the first double-encrypted full data set and a second double-encrypted sampling data set, the second double-encrypted sampling data set is obtained by the first party by encrypting the second single-encrypted sampling data set by using the first key, and the one or more additional elements are obtained by performing second sampling on a complement other than the original intersection in the second double-encrypted sampling data set; and related information of common data is determined based on the element index.

According to a third aspect, a common data determining method for protecting privacy is provided, including the following: a first party encrypts, by using a first key, each piece of first data in a first data set held by the first party, to obtain the first single-encrypted full data set, and sends the first single-encrypted full data set to a second party; the second party at least re-encrypts each piece of data in the first single-encrypted full data set by using a second key, to obtain a first double-encrypted full data set; the second party performs first sampling and single-encryption based on the second key based on a second data set held by the second party, to obtain a second single-encrypted sampling data set; the second party sends the first double-encrypted full data set and the second single-encrypted sampling data set to the first party; the first party encrypts the second single-encrypted sampling data set by using the first key, to obtain a second double-encrypted sampling data set; determines an intersection of the first double-encrypted full data set and the second double-encrypted sampling data set as an original intersection; performs second sampling on a complement other than the original intersection in the second double-encrypted sampling data set; and adds one or more obtained elements to the original intersection, to obtain a noise-added intersection; the first party sends an element index of the noise-added intersection to the second party; and the second party determines related information of common data based on the element index.

According to a fourth aspect, a common data determining apparatus for protecting privacy is provided, deployed in a first party, and including the following: an encryption unit, configured to encrypt, by using a first key held by the first party, each piece of first data in a first data set held by the first party, to obtain a first single-encrypted full data set, and send the first single-encrypted full data set to a second party; a receiving unit, configured to receive a first double-encrypted full data set and a second single-encrypted sampling data set from the second party, where the first double-encrypted full data set is obtained by at least re-encrypting each piece of data in the first single-encrypted full data set by using a second key of the second party, and the second single-encrypted sampling data set is obtained by the second party by performing first sampling and single-encryption based on the second key on a second data set held by the second party; an intersection determining unit, configured to re-encrypt the second single-encrypted sampling data set by using the first key, to obtain a second double-encrypted sampling data set, and determine an intersection of the first double-encrypted full data set and the second double-encrypted sampling data set as an original intersection; a second sampling unit, configured to perform second sampling on a complement other than the original intersection in the second double-encrypted sampling data set, and add one or more obtained additional elements to the original intersection, to obtain a noise-added intersection; and a sending unit, configured to send an element index of the noise-added intersection to the second party, so that the second party determines related information of common data.

According to a fifth aspect, a common data determining apparatus for protecting privacy is provided, deployed in a second party, and including the following: a first data processing unit, configured to receive a first single-encrypted full data set from a first party, where the first single-encrypted full data set is obtained by the first party by encrypting, by using a first key, each piece of first data in a first data set held by the first party, and at least re-encrypt each piece of data in the first single-encrypted full data set by using a second key of the second party, to obtain a first double-encrypted full data set; a second data processing unit, configured to perform first sampling and single-encryption based on the second key based on a second data set held by the second party, to obtain a second single-encrypted sampling data set; a sending unit, configured to send the first double-encrypted full data set and the second single-encrypted sampling data set to the first party; a receiving unit, configured to receive an element index of a noise-added intersection from the first party, where the noise-added intersection is obtained by adding one or more additional elements to an original intersection, the original intersection is an intersection of the first double-encrypted full data set and a second double-encrypted sampling data set, the second double-encrypted sampling data set is obtained by the first party by encrypting the second single-encrypted sampling data set by using the first key, and the additional elements are obtained by performing second sampling on a complement other than the original intersection in the second double-encrypted sampling data set; and a determining unit, configured to determine related information of common data based on the element index.

According to a sixth aspect, a common data determining system for protecting privacy is provided, including a first party and a second party, where the first party is configured to encrypt, by using a first key, each piece of first data in a first data set held by the first party, to obtain the first single-encrypted full data set, and send the first single-encrypted full data set to a second party; the second party is configured to at least re-encrypt each piece of data in the first single-encrypted full data set by using a second key, to obtain a first double-encrypted full data set; perform first sampling and single-encryption based on the second key based on a second data set held by the second party, to obtain a second single-encrypted sampling data set; and send the first double-encrypted full data set and the second single-encrypted sampling data set to the first party; the first party is further configured to encrypt the second single-encrypted sampling data set by using the first key, to obtain a second double-encrypted sampling data set; determine an intersection of the first double-encrypted full data set and the second double-encrypted sampling data set as an original intersection; perform second sampling on a complement other than the original intersection in the second double-encrypted sampling data set; add one or more obtained elements to the original intersection, to obtain a noise-added intersection; and send an element index of the noise-added intersection to the second party; and the second party is further configured to determine related information of common data based on the element index.

According to a seventh aspect, a computer-readable storage medium is provided, where the computer-readable storage medium stores a computer program, and when the computer program is executed on a computer, the computer is enabled to perform the method according to any one of the first aspect to the third aspect.

According to an eighth aspect, a computing device is provided, including a memory and a processor, where the memory stores executable code, and when executing the executable code, the processor implements the method according to any one of the first aspect to the third aspect.

In the common data determining solution provided in the embodiments of this specification, the second party first performs downsampling on local data that participate in intersection, and randomly deletes some data (the data may be common data). Then, the first party adds some interference data that are not common data on the basis of a real intersection through upsampling, so that an intersection result includes specific noise, and has specific uncertainty. Either party cannot explicitly determine, based on the noise-added intersection result, whether a single piece of data is in the intersection, thereby protecting data privacy. In addition, an impact caused by uncertainty of the intersection result on subsequent statistical calculation performed based on the intersection result is also controlled within a specific range, so that a statistical calculation result can be still used. As such, a statistical calculation need of the common data in a privacy protection scenario is satisfied. In addition, communication and calculation processes in the above-mentioned solution are very simple, so that an execution effect is very high, and can be used as a frequently-used private data intersection protocol.

BRIEF DESCRIPTION OF DRAWINGS

To describe the technical solutions in the embodiments of this application more clearly, the following briefly describes the accompanying drawings needed for describing the embodiments. Clearly, the accompanying drawings in the following descriptions show merely some embodiments of this application, and a person of ordinary skill in the art can still derive other drawings from these accompanying drawings without creative efforts.

DESCRIPTION OF EMBODIMENTS

The following describes the solutions provided in this specification with reference to the accompanying drawings.

As data security and privacy protection are enhanced, a need for protecting user privacy is put forward in increasingly more technical scenarios. This poses an increasingly high challenge to data processing performed through multi-party collaboration. In terms of private data intersection (PSI) performed through multi-party collaboration, in some current technical scenarios, a PSI intersection result needs to be calculated. However, for reasons such as privacy protection or laws and regulations, the intersection result is not allowed to explicitly disclose to either party.

Figure 1:
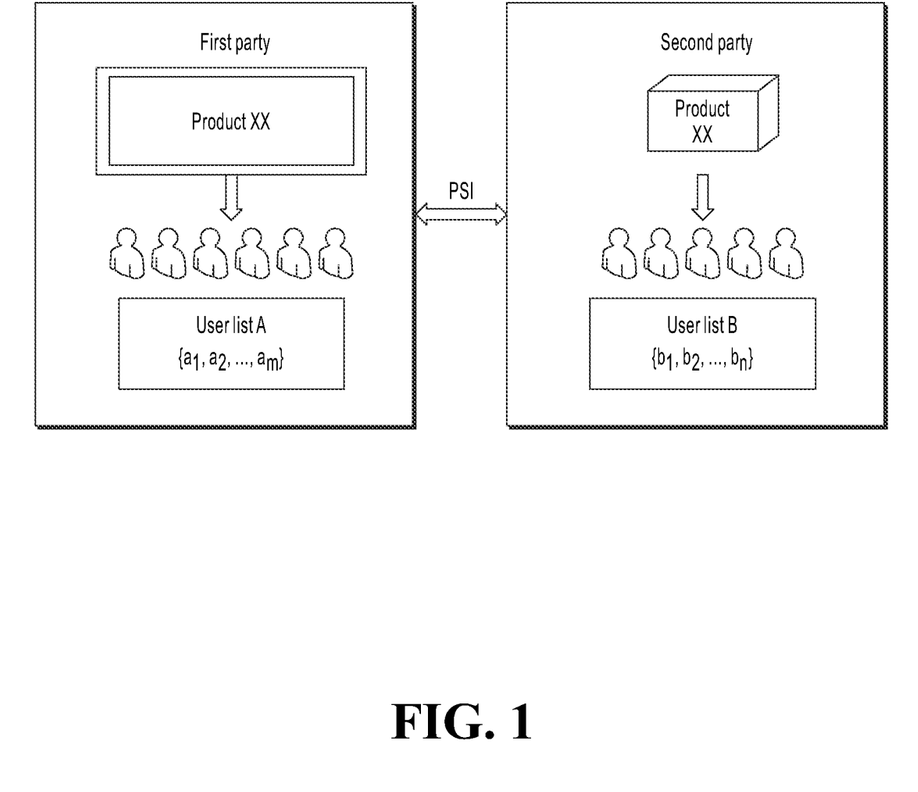
FIG. 1 shows an example scenario where both parties perform PSI calculation.

FIG. 1 shows an example scenario where both parties perform PSI calculation. In the scenario in FIG. 1, a first party, that is, a party A, is, for example, an advertising platform, and a second party, that is, a party B, is, for example, an advertiser. The advertising platform can display advertising information such as a product xx of the advertiser by using various advertising means such as page display and message pushing. The advertising platform can record a user list A reached by the advertisement, for example, $\{a_1, a_2, \ldots, a_m\}$. In addition, the advertiser can provide sales means for the product xx by using an online shopping mall or brick-and-mortar, and can record a user list B who has purchased the product xx, for example, record the list as $\{b_1, b_2, \ldots, b_n\}$. The advertiser may need to know how many users in the user list B who has purchased the product are diverted through recommendation of the advertising platform. Therefore, the both parties may expect to determine a common user in the two user lists as an advertising diverted user through PSI. Generally, the advertiser can also record a purchase situation of a user, for example, a purchase quantity and a purchase amount. Therefore, the advertiser can determine further advertising revenue information based on the common user, for example, a quantity of diverted users, sales brought by the advertisement, and a sales percentage.

However, a specific user U may not authorize one party to disclose information of the user U to the other parties to determine that the user U is also a registered user of the other parties, and the party may have already disclosed privacy of the user. Alternatively, based on privacy protection needs of some regions or some applications, disclosure of registration information of a user is not allowed. In conclusion, if an intersection result, that is, a common user list, is disclosed to either party, privacy information may be disclosed. However, in the above-mentioned technical scenario, further advertising revenue information needs to be determined based on the intersection result. Therefore, in this scenario, a PSI intersection result needs to be calculated, but the intersection result is not allowed to explicitly disclose to either party.

For another example, the first party can be a bank institution, and the second party can be a credit center. The both parties may expect to determine, through PSI, a common user as a user who has a loan in the bank, and then collect statistics about some loan-related information such as a total quantity of loan users and an average income and expense. However, the user may not authorize the bank or the credit center to disclose card issuing information/loan information of the user in a corresponding institution. Therefore, the common user is disclosed to either party, private data of the user are also disclosed.

Therefore, in a plurality of scenarios, there is a technical need that a data intersection result is calculated but the intersection result is not allowed to explicitly disclose to either party.

As described above, most existing PSI solutions do not satisfy this technical need. Specifically, a solution of disclosing the intersection result to a certain party or both parties still brings a privacy risk. However, a solution for obtaining a cryptographic intermediate result, for example, a homomorphic encryption solution, can be applicable only to some subsequent calculation manners, and it is difficult to satisfy a need in terms of communication costs and calculation costs.

In view of this, the inventor proposes a PSI solution based on differential privacy (DP). Based on this solution, noise that complies with a characteristic of differential privacy is introduced in an intersection process to obtain a noise-added intersection. The noise-added intersection has specific uncertainty. Therefore, based on the noise-added intersection, either party cannot explicitly determine whether a specific piece of data such as a specific user U necessarily belongs to the intersection. However, a party holding additional feature data can perform further statistics collection or calculation based on the noise-added intersection, and a calculation result still satisfies a need of differential privacy, that is, has calculation precision corresponding to a predetermined privacy budget. As such, technical needs of the above-mentioned plurality of scenarios can be satisfied.

Figure 2:
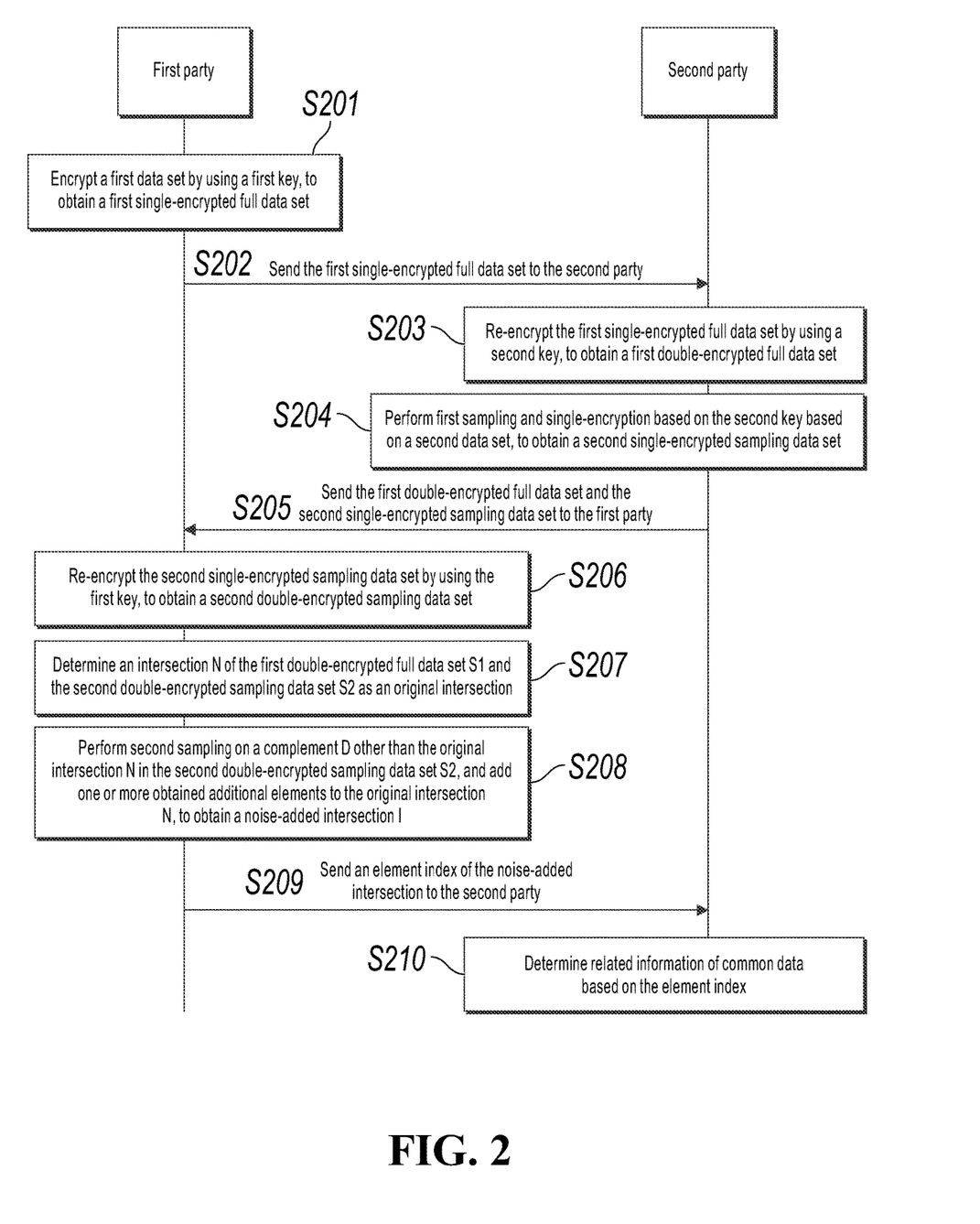
FIG. 2 is an interaction diagram illustrating an implementation procedure for determining common data by both parties, according to one or more embodiments.
Figure 3:
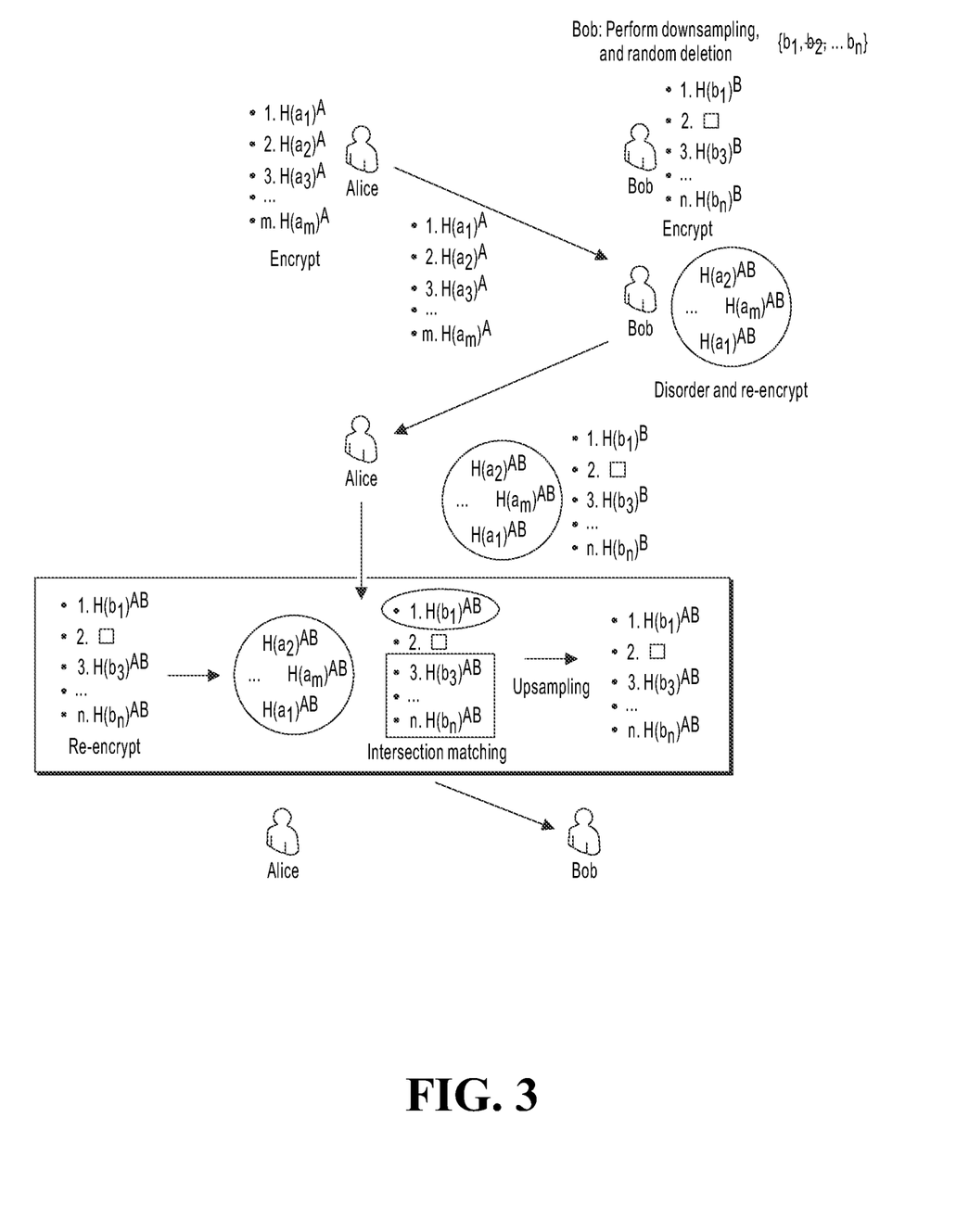
FIG. 3 shows a specific example of determining common data by both parties.

With reference to FIG. 2 and FIG. 3, the following describes in detail a technical implementation process of the PSI solution based on differential privacy.

FIG. 2 is an interaction diagram illustrating an implementation procedure for determining common data by both parties, according to one or more embodiments. As shown in the figure, both parties are shown as a first party and a second party. The first party and the second party each can be specifically implemented as any server, apparatus, platform, device, or device cluster that has a calculation and processing capability. No limitation is imposed here. In different service scenarios in different embodiments, the first party and the second party can have different service roles. In one embodiment, the first party can be an advertising platform, and the second party can be an advertiser. In another embodiment, the first party can be a credit center database, and the second party can be a bank database. The implementation solution can be further applied to another technical scenario. Only an example is provided for illustration here, and no limitation is imposed.

The first party holds a first data set including local private data (referred to as first data) of the first party, and the first data set is denoted as $\{a_1, a_2, \ldots, a_m\}$. The second party holds a second data set including local private data (referred to as second data) of the second party, and the second data set is denoted as $\{b_1, b_2, \ldots, b_n\}$. The first data and the second data are recorded in the pre-agreed same format/same form. The first data/second data can be user-related data, for example, a user account or other user personal information. For example, when the first party is an advertising platform, and the second party is an advertiser, the first data set can be a user list reached by a certain advertisement, and the second data set can be a user list who has purchased a product corresponding to the advertisement. Alternatively, the first data/second data can be other data that are considered as needing privacy protection. Before privacy intersection is implemented, the first party and the second party agree on an algorithm used for encryption, and each generates a key applicable to the algorithm.

As shown in FIG. 2, a procedure of a method for determining common data of the both parties includes the following steps:

In step 201, the first party encrypts, by using a first key of the first party, each piece of first data in the first data set held by the first party, to obtain a first single-encrypted full data set.

In one or more embodiments, the first party can encrypt each piece of first data $a_i$ in the first data set $\{a_1, a_2, \ldots, a_m\}$ by using the following encryption algorithm. First, the first party calculates each hash value $H(a_i)$ corresponding to each piece of first data $a_i$ by using an agreed hash function H. The agreed hash function H can be used to map input data to a mutually agreed group. Then, the first party respectively performs an encryption operation on each hash value $H(a_i)$ by using the first key A held by the first party, to obtain the first single-encrypted full data set $\{H(a_1)^A, H(a_2)^A, \ldots, H(a_m)^A\}$.

FIG. 3 shows a specific example of determining common data by both parties. In this example, the first party is represented as Alice, and the second party is represented as Bob. The first party obtains the first single-encrypted full data set based on the above-mentioned encryption method, and the first single-encrypted full data set includes m pieces of single-encrypted first data obtained by respectively encrypting m pieces of first data by using the first key A: $H(a_1)^A, H(a_2)^A, \ldots, H(a_m)^A$.

It is worthwhile to note that one encryption algorithm is described by using the above-mentioned example. In practice, various encryption algorithms independent of an encryption sequence can be used, that is, when an encryption algorithm for performing encryption first by using the key A and then by using a key B has the same result as an encryption algorithm for performing encryption first by using the key B and then by using the key A, the two algorithms can be both used in the above-mentioned encryption process. A plurality of symmetric encryption algorithms satisfy the above-mentioned characteristic.

Back to FIG. 2, in step 202, the first party sends the first single-encrypted full data set to the second party.

In step 203, the second party at least re-encrypts each piece of data in the first single-encrypted full data set by using a second key, to obtain a first double-encrypted full data set.

The example of the above-mentioned encryption algorithm is still used. When the first single-encrypted full data set is $\{H(a_1)^A, H(a_2)^A, \ldots, H(a_m)^A\}$, the second party can re-encrypt each element in the first single-encrypted full data set by using the second key B of the second party, for example, to obtain $\{H(a_1)^{AB}, H(a_2)^{AB}, \ldots, H(a_m)^{AB}\}$ as the first double-encrypted full data set.

In one or more embodiments, to further protect data privacy and security, and prevent the first party from finding the encryption patterns, the second party can disorder and re-encrypt the element in the first single-encrypted full data set, to obtain the first double-encrypted full data set. Specifically, the second party can first disorder each piece of data in the first single-encrypted full data set $\{H(a_1)^A, H(a_2)^A, \ldots, H(a_m)^A\}$, and then re-encrypt each piece of disordered data by using the second key B. Alternatively, the second party can first re-encrypt each piece of data in the first single-encrypted full data set by using the second key B, and then disorder re-encrypted data $\{H(a_1)^{AB}, H(a_2)^{AB}, \ldots, H(a_m)^{AB}\}$ to finally obtain the first double-encrypted full data set. In FIG. 3, $H(a_2)^{AB}, \ldots, H(a_m)^{AB}, \ldots, H(a_1)^{AB}$ show the first double-encrypted full data set obtained after disorder and re-encryption.

In addition, in step 204, the second party performs first sampling and single-encryption based on the second key based on the second data set held by the second party, to obtain a second single-encrypted sampling data set.

In one or more specific embodiments, the second party can first perform first sampling on the second data set $\{b_1, b_2, \ldots, b_n\}$, and then apply single-encryption based on the second key to a sampling data set obtained through first sampling. Alternatively, the second party can first apply single-encryption based on the second key to each piece of second data in the second data set $\{b_1, b_2, \ldots, b_n\}$, and then perform first sampling on a second single-encrypted data set obtained through single-encryption.

In the above-mentioned process, first sampling performed by the second party can also be referred to as downsampling, and is intended to reserve a part of elements in a target set to be sampled, and delete a part of elements. The first case is used as an example for description. For each element in the target data set $\{b_1, b_2, \ldots, b_n\}$, the element is reserved as a sampling element based on a first probability P1, and the element is deleted based on a probability of 1−P1, where the first probability P1 is positively correlated with a predetermined first privacy budget.

In a specific example, the first probability P1 can be represented as:

$$P1 = e^{\varepsilon_1}/1 + e^{\varepsilon_1} \qquad (1)$$

where $\varepsilon_1$ is the predetermined first privacy budget. A larger first privacy budget $\varepsilon_1$ indicates a larger P1, a downsampling result closer to the original target data set, and a more accurate intersection result. On the contrary, a smaller $\varepsilon_1$ indicates a smaller P1, a downsampling result more different from the original target data set, and larger privacy protection strength.

In the example in FIG. 3, assume that the second party deletes the element $b_2$ and reserves other elements through downsampling. In this case, an obtained sampling data set is represented as $\{b_1, b_3, \ldots, b_n\}$ as an example.

A single-encryption process executed by the second party is similar to the single-encryption process executed by the first party. For example, when any second data $b_j$ are used as an encryption object, the second party can calculate a hash value $H(b_j)$ of the encryption object by using the agreed hash function H, and perform an encryption operation on the hash value $H(b_j)$ by using the second key B held by the second party, to obtain a corresponding encryption result $H(b_j)^B$. In this case, after single-encryption is performed on each element in the sampling data set $\{b_1, b_3, \ldots, b_n\}$, the obtained second single-encrypted sampling data set can be represented as $\{H(b_j)^B, H(b_3)^B, \ldots, H(b_n)^B\}$ as an example.

Certainly, the second party can first perform single-encryption and then perform first sampling, to obtain the same result.

It is worthwhile to note that step 204 and steps 201 to 203 can be performed in parallel, or can be performed based on any sequence. No limitation is imposed here.

Then, in step 205, the second party sends the previously-obtained first double-encrypted full data set and the previously-obtained second single-encrypted sampling data set to the first party.

Then, in step 206, the first party re-encrypts the second single-encrypted sampling data set by using the first key, to obtain a second double-encrypted sampling data set.

The above-mentioned example is still used. When the second single-encrypted sampling data set is $\{H(b_1)^B, H(b_3)^B, \ldots, H(b_n)^B\}$, the first party can re-encrypt each element in the second single-encrypted sampling data set by using the first key A of the first party, for example, to obtain $\{H(b_1)^{AB}, H(b_3)^{AB}, \ldots, H(b_n)^{AB}\}$ as the second double-encrypted sampling data set.

As such, the element in the first double-encrypted full data set S1 is data obtained by performing double-encryption on the first data of the first party successively by using the first key and the second key, and the element in the second double-encrypted sampling data set S2 is data obtained by performing double-encryption on the second data of the second party successively by using the second key and the first key. As described above, the encryption algorithm here has a characteristic of being independent of the encryption sequence. Therefore, if the both parties have same data, results obtained after double-encryption should be the same.

In this case, in step 207, the first party determines an intersection N of the first double-encrypted full data set S1 and the second double-encrypted sampling data set S2 as an original intersection, that is, N=S1∩S2. It can be understood that an element in the original intersection N necessarily belongs to common data of the both parties.

However, the second double-encrypted sampling data set is obtained by performing downsampling on the second data set, and is not an encryption result of the entire second data set. As a result, some real common data may be missed. The first party next compensates for the original intersection through upsampling.

As shown in step 208, the first party performs second sampling on a complement D other than the original intersection N in the second double-encrypted sampling data set S2, and adds one or more obtained additional elements to the original intersection N, to obtain a noise-added intersection I.

A second-sampling process can also be referred to as upsampling, and is intended to expand elements in the original intersection N. To perform upsampling, the first party first determines the complement D other than the original intersection N in the second double-encrypted sampling data set S2, then performs sampling on one or more elements in the complement D based on a second probability P2, where one or more additional elements obtained through sampling forms a second sampling set D', and adds the second sampling set D' to the original intersection N, to obtain the noise-added intersection I. It can be understood that the element included in the complement D is not an encryption result of the real common data. Therefore, the second sampling set D' is equivalent to a noise set added to a partial real intersection. Setting of the second probability P2 is also related to a privacy budget. Specifically, the second probability P2 is negatively correlated with a predetermined second privacy budget.

In a specific example, the second probability P2 can be represented as:

$$P2 = 1/1+e^{\varepsilon_1} \quad (1)$$

where $\varepsilon_2$ is the predetermined second privacy budget. A larger second privacy budget $\varepsilon_2$ indicates a smaller P2, smaller cardinality of the noise set, and a more accurate intersection result. On the contrary, a smaller $\varepsilon_2$ indicates a larger P2, larger cardinality of the noise set obtained through upsampling, and larger privacy protection strength.

It should be understood that the second privacy budget $\varepsilon_2$ can be the same as or different from the first privacy budget $\varepsilon_1$ set for the first probability P1, and can be set based on needs.

Steps 207 and 208 are described with reference to the example in FIG. 3. For example, as shown in FIG. 3, the first double-encrypted full data set S1 can be represented as $\{H(a_2)^{AB}, \ldots, H(a_m)^{AB}, \ldots, H(a_1)^{AB}\}$, and the second double-encrypted sampling data set S2 can be represented as $\{H(b_1)^{AB}, H(b_3)^{AB}, \ldots, H(b_n)^{AB}\}$, and the two sets are both data obtained by performing double-encryption by using the first key A and the second key B. Assume that an only matching element in S1 and S2 is $H(a_1)^{AB}=H(b_1)^{AB}$. In this case, in S2, a part shown by an ellipse is the intersection part N, and a part shown by a box is the complement part D. In this case, second sampling is performed on the complement part D. Assume that additional elements $H(b_3)^{AB}$ and $H(b_n)^{AB}$ are obtained through sampling to form the second sampling set D' (that is, the noise set). Then, the first party Alice adds the noise set D' to the original intersection part N to obtain the noise-added intersection I=$\{H(b_1)^{AB}, H(b_3)^{AB}, H(b_n)^{AB}\}$ that includes the real intersection data $H(b_1)^{AB}$ and the additional elements $H(b_3)^{AB}$ and $H(b_n)^{AB}$ obtained through upsampling.

Then, in step 209, the first party sends an element index of the above-mentioned noise-added intersection to the second party. For example, in the above-mentioned example, the first party can send the element index (1, 3, n) to the second party.

In this case, in step 210, the second party determines related information of the common data based on the element index.

In one or more embodiments, the second party can determine, based on the element index, second data corresponding to the element index in the second data set as noise-added common data. When the second data set includes a user list, a user corresponding to the above-mentioned element index can be used as a noise-added common user. For example, for the element index (1, 3, n), the second party can determine users corresponding to $\{b_1, b_3, b_n\}$ as common users. Because noise is added to the intersection information, the second party cannot uniquely determine whether a specific user such as $b_3$ is really a common user. As such, data privacy and security are protected.

Further, the second party generally further holds an attribute feature of each object corresponding to the second data. In one or more embodiments, the second party can obtain an attribute feature of each object corresponding to the noise-added common data, and determine, based on the attribute feature of each object, a noise-added statistical result of the common data related to the attribute feature. The noise-added statistical result can include a calculation result such as an average, a distribution, a total, and a mean square error.

For example, when the first party is an advertising platform, and the second party is an advertiser (a product seller), the second party can determine a noise-added common user, that is, an advertising diverted user, based on the noise-added intersection, and can further obtain an attribute feature of the user related to product sales, for example, a quantity, an amount, and a quantity of times of a purchased product, to obtain a noise-added statistical result related to the attribute feature, for example, a quantity of advertising diverted users, sales brought by the advertisement, and a sales percentage.

Mathematically, it can be proved that, the first probability of downsampling and the second probability of upsampling are designed, so that the noise-added statistical result can comply with a characteristic of differential privacy, and satisfy needs under a specified privacy budget in terms of data availability and privacy protection strength.

Reviewing the above-mentioned process, in the common data determining process, the second party first performs downsampling on local data that participate in intersection, and randomly deletes some data (the data may be common data). Then, the first party adds some interference data that are not common data on the basis of a real intersection through upsampling, so that an intersection result includes specific noise, and has specific uncertainty. Either party cannot explicitly determine, based on the noise-added intersection result, whether a single piece of data is in the intersection, thereby protecting data privacy. In addition, an impact caused by uncertainty of the intersection result on subsequent statistical calculation performed based on the intersection result is also controlled within a specific range, so that a statistical calculation result can be still used. As such, a statistical calculation need of the common data in a privacy protection scenario is satisfied. In addition, communication and calculation processes in the above-mentioned solution are very simple, so that an execution effect is very high, and can be used as a frequently-used private data intersection protocol.

Figure 4:
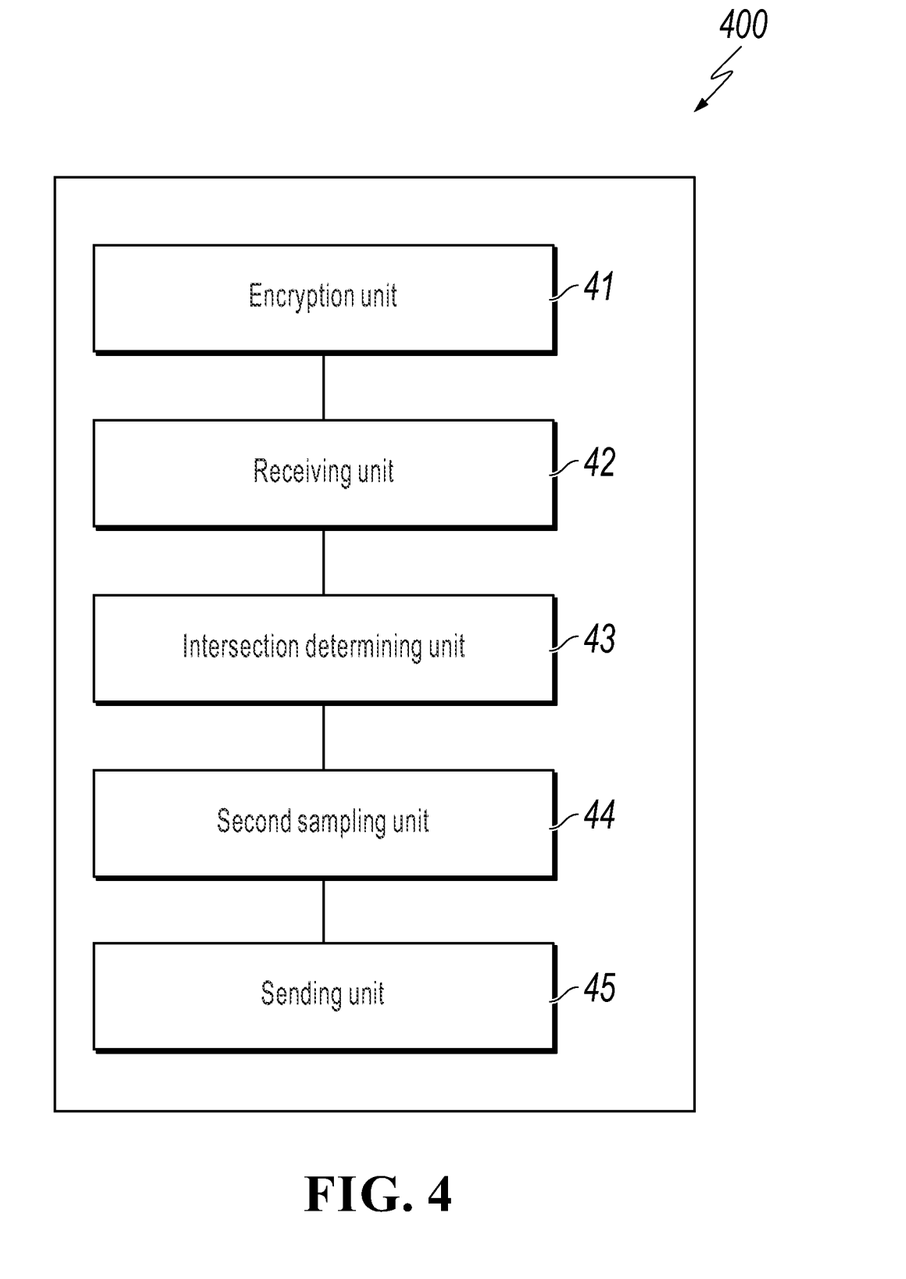
FIG. 4 is a schematic structural diagram illustrating a common data determining apparatus deployed in a first party, according to one or more embodiments.

According to another aspect, corresponding to the above-mentioned procedure of the common data determining method, the embodiments of this specification further disclose a common data determining apparatus. The apparatus is deployed in a first party, and the first party can be implemented as any computing unit, platform, server, device, etc. that has a calculation and processing capability. FIG. 4 is a schematic structural diagram illustrating a common data determining apparatus deployed in a first party, according to one or more embodiments. As shown in FIG. 4, the apparatus 400 includes the following: an encryption unit 41, configured to encrypt, by using a first key held by the first party, each piece of first data in a first data set held by the first party, to obtain a first single-encrypted full data set, and send the first single-encrypted full data set to a second party; a receiving unit 42, configured to receive a first double-encrypted full data set and a second single-encrypted sampling data set from the second party, where the first double-encrypted full data set is obtained by at least re-encrypting each piece of data in the first single-encrypted full data set by using a second key of the second party, and the second single-encrypted sampling data set is obtained by the second party by performing first sampling and single-encryption based on the second key on a second data set held by the second party; an intersection determining unit 43, configured to re-encrypt the second single-encrypted sampling data set by using the first key, to obtain a second double-encrypted sampling data set, and determine an intersection of the first double-encrypted full data set and the second double-encrypted sampling data set as an original intersection; a second sampling unit 44, configured to perform second sampling on a complement other than the original intersection in the second double-encrypted sampling data set, and add one or more obtained additional elements to the original intersection, to obtain a noise-added intersection; and a sending unit 45, configured to send an element index of the noise-added intersection to the second party, so that the second party determines related information of common data.

Based on one or more implementations, the first data set includes a user account or user personal information as the first data.

Based on one or more embodiments, the encryption unit 41 is specifically configured to calculate each hash value corresponding to each piece of first data by using an agreed hash function, and respectively perform an encryption operation on each hash value by using the first key, to obtain the first single-encrypted full data set.

Based on one or more embodiments, the second sampling performed by the second sampling unit 44 includes performing sampling on one or more elements in the complement based on a second probability, where the second probability is negatively correlated with a predetermined second privacy budget.

In one or more embodiments, the first double-encrypted full data set received by the receiving unit 42 is obtained by disordering and re-encrypting based on the first single-encrypted full data set.

Figure 5:
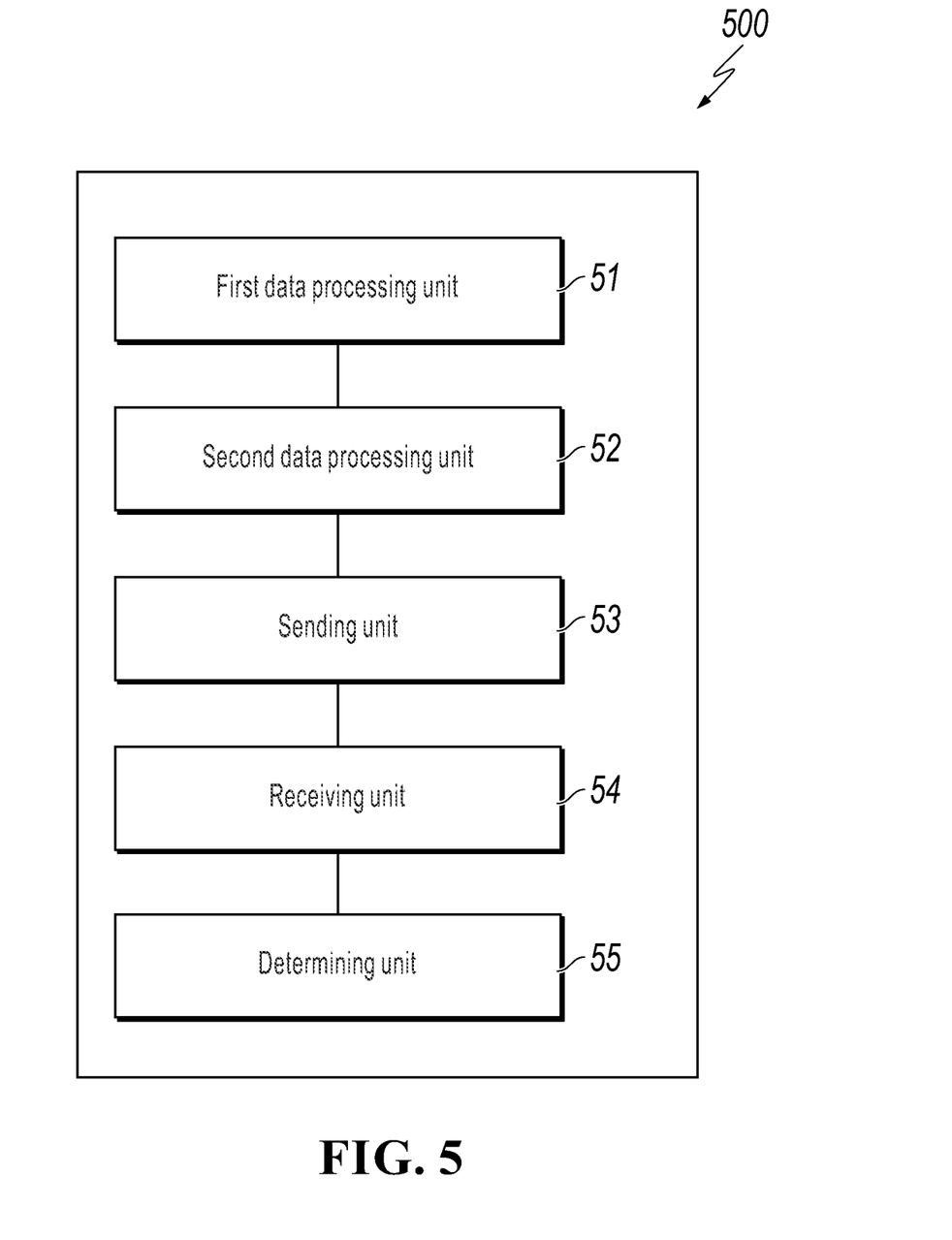
FIG. 5 is a schematic structural diagram illustrating a common data determining apparatus deployed in a second party, according to one or more embodiments.

According to another aspect, the embodiments of this specification further disclose a common data determining apparatus. The apparatus is deployed in a second party, and the second party can be implemented as any computing unit, platform, server, device, etc. that has a calculation and processing capability. FIG. 5 is a schematic structural diagram illustrating a common data determining apparatus deployed in a second party, according to one or more embodiments. As shown in FIG. 5, the apparatus 500 includes the following: a first data processing unit 51, configured to receive a first single-encrypted full data set from a first party, where the first single-encrypted full data set is obtained by the first party by encrypting, by using a first key, each piece of first data in a first data set held by the first party, and at least re-encrypt each piece of data in the first single-encrypted full data set by using a second key of the second party, to obtain a first double-encrypted full data set; a second data processing unit 52, configured to perform first sampling and single-encryption based on the second key based on a second data set held by the second party, to obtain a second single-encrypted sampling data set; a sending unit 53, configured to send the first double-encrypted full data set and the second single-encrypted sampling data set to the first party; a receiving unit 54, configured to receive an element index of a noise-added intersection from the first party, where the noise-added intersection is obtained by adding one or more additional elements to an original intersection, the original intersection is an intersection of the first double-encrypted full data set and a second double-encrypted sampling data set, the second double-encrypted sampling data set is obtained by the first party by encrypting the second single-encrypted sampling data set by using the first key, and the one or more additional elements are obtained by performing second sampling on a complement other than the original intersection in the second double-encrypted sampling data set; and a determining unit 55, configured to determine related information of common data based on the element index.

In one or more embodiments, the second data set includes a user account or user personal information.

Based on one or more implementations, the first data processing unit 51 is specifically configured to disorder each piece of data in the first single-encrypted full data set, and re-encrypt each piece of disordered data by using the second key; or re-encrypt each piece of data in the first single-encrypted full data set by using the second key, and disorder re-encrypted data.

Based on one or more implementations, the second data processing unit 52 is specifically configured to perform first sampling on the second data set held by the second party, and apply single-encryption based on the second key to a sampling data set obtained through first sampling; or apply single-encryption based on the second key to each piece of second data in the second data set held by the second party, and perform first sampling on a second single-encrypted data set obtained through single-encryption.

Further, in on one or more embodiments, the single-encryption performed by the second data processing unit 52 includes the following: calculating each hash value of each encryption object by using an agreed hash function, and respectively performing an encryption operation on each hash value by using the second key.

Further, in on one or more embodiments, the first sampling performed by the second data processing unit 52 includes the following: for each element in a target set to be sampled, reserving the element as a sampling element based on a first probability, where the first probability is positively correlated with a predetermined first privacy budget.

Based on one or more implementations, the determining unit 55 is configured to determine corresponding second data in the second data set as noise-added common data based on the element index.

Further, in one or more embodiments, the determining unit 55 is further configured to obtain an attribute feature of each object corresponding to the noise-added common data, and determine, based on the attribute feature of each object, a noise-added statistical result of the common data related to the attribute feature.

Further, the noise-added statistical result includes one of the following: an average, a distribution, a total, and a mean square error.

According to still another aspect, the embodiments of this specification further disclose a common data determining system. The system includes a first party and a second party.

The first party is configured to encrypt, by using a first key, each piece of first data in a first data set held by the first party, to obtain the first single-encrypted full data set, and send the first single-encrypted full data set to a second party.

The second party is configured to at least re-encrypt each piece of data in the first single-encrypted full data set by using a second key, to obtain a first double-encrypted full data set; perform first sampling and single-encryption based on the second key based on a second data set held by the second party, to obtain a second single-encrypted sampling data set; and send the first double-encrypted full data set and the second single-encrypted sampling data set to the first party.

The first party is further configured to encrypt the second single-encrypted sampling data set by using the first key, to obtain a second double-encrypted sampling data set; determine an intersection of the first double-encrypted full data set and the second double-encrypted sampling data set as an original intersection; perform second sampling on a complement other than the original intersection in the second double-encrypted sampling data set; add one or more obtained elements to the original intersection to obtain a noise-added intersection; and send an element index of the noise-added intersection to the second party.

The second party is further configured to determine related information of common data based on the element index.

According to the above-mentioned apparatuses and systems, in the common data determining process, the both parties interacting with each other can determine related information of the common data when data privacy is protected.

According to one or more embodiments of another aspect, a computer-readable storage medium is further provided. The computer-readable storage medium stores a computer program. When the computer program is executed in a computer, the computer is enabled to perform the method performed by each party in the common data determining process.

According to one or more embodiments of still another aspect, a computing device is further provided, and includes a memory and a processor. The memory stores executable code. When executing the executable code, the processor implements the method performed by each party in the common data determining process.

A person skilled in the art should be aware that in the above-mentioned one or more examples, functions described in this application can be implemented by hardware, software, firmware, or any combination thereof. When this application is implemented by software, the functions can be stored in a computer-readable medium or transmitted as one or more instructions or code in the computer-readable medium.

The objectives, technical solutions, and beneficial effects of this application are further described in detail in the above-mentioned specific implementations. It should be understood that the above-mentioned descriptions are merely specific implementations of this application, but are not intended to limit the protection scope of this application. Any modification, equivalent replacement, or improvement made based on the technical solutions of this application shall fall within the protection scope of this application.

What is claimed is:

1. A computer-implemented method for protecting privacy, performed by a first party, and comprising:
encrypting, by using a first key held by the first party, each piece of first data in a first data set held by the first party, to obtain a first single-encrypted full data set;
sending the first single-encrypted full data set to a second party;
receiving a first double-encrypted full data set and a second single-encrypted sampling data set from the second party, wherein the first double-encrypted full data set is obtained by at least re-encrypting each piece of data in the first single-encrypted full data set by using a second key of the second party, and the second single-encrypted sampling data set is obtained by performing first sampling and single-encryption based on the second key on a second data set held by the second party;
re-encrypting the second single-encrypted sampling data set by using the first key to obtain a second double-encrypted sampling data set;
determining an intersection of the first double-encrypted full data set and the second double-encrypted sampling data set as an original intersection;
performing second sampling on a complement other than the original intersection in the second double-encrypted sampling data set to obtain one or more obtained additional elements;
adding the one or more obtained additional elements to the original intersection to obtain a noise-added intersection; and sending an element index of the noise-added intersection to the second party.

2. The computer-implemented method according to claim 1, wherein the first data set comprises a user account or user personal information as the first data.

3. The computer-implemented method according to claim 1, wherein the encrypting, by using a first key held by the first party, each piece of first data in a first data set held by the first party comprises:
calculating each hash value corresponding to the each piece of first data by using a hash function; and
respectively performing an encryption operation on the each hash value by using the first key to obtain the first single-encrypted full data set.

4. The computer-implemented method according to claim 1, wherein the second sampling comprises:
performing sampling on one or more elements in the complement based on a second probability, wherein the second probability is negatively correlated with a predetermined second privacy budget.

5. The computer-implemented method according to claim 1, wherein the first double-encrypted full data set is obtained by disordering and re-encrypting based on the first single-encrypted full data set.

6. A computer-implemented method for protecting privacy, performed by a second party, and comprising:
receiving a first single-encrypted full data set from a first party, wherein the first single-encrypted full data set is obtained by encrypting, by using a first key, each piece of first data in a first data set;
at least re-encrypting each piece of data in the first single-encrypted full data set by using a second key of the second party to obtain a first double-encrypted full data set;
performing first sampling and single-encryption based on the second key based on a second data set held by the second party to obtain a second single-encrypted sampling data set;
sending the first double-encrypted full data set and the second single-encrypted sampling data set to the first party;
receiving an element index of a noise-added intersection from the first party, wherein:
the noise-added intersection is obtained by adding one or more additional elements to an original intersection,
the original intersection is an intersection of the first double-encrypted full data set and a second double-encrypted sampling data set,
the second double-encrypted sampling data set is obtained by encrypting the second single-encrypted sampling data set by using the first key, and
the one or more additional elements are obtained by performing second sampling on a complement other than the original intersection in the second double-encrypted sampling data set; and
determining related information of common data based on the element index.

7. The computer-implemented method according to claim 6, wherein the second data set comprises a user account or user personal information.

8. The computer-implemented method according to claim 6, wherein the first double-encrypted full data set is obtained by operations comprising:
disordering each piece of data in the first single-encrypted full data set, and re-encrypting each piece of disordered data by using the second key; or
re-encrypting each piece of data in the first single-encrypted full data set by using the second key, and disordering re-encrypted data.

9. The computer-implemented method according to claim 6, wherein the second single-encrypted sampling data set is obtained by operations comprising:
performing first sampling on the second data set held by the second party, and applying single-encryption based on the second key to a sampling data set obtained through first sampling; or
applying single-encryption based on the second key to each piece of second data in the second data set held by the second party, and performing first sampling on a second single-encrypted data set obtained through single-encryption.

10. The computer-implemented method according to claim 6, wherein the single-encryption based on the second key comprises:
calculating each hash value of each encryption object by using a hash function; and
respectively performing an encryption operation on the each hash value by using the second key.

11. The computer-implemented method according to claim 6, wherein the first sampling comprises:
for each element in a target set to be sampled, reserving the element as a sampling element based on a first probability, wherein the first probability is positively correlated with a predetermined first privacy budget.

12. The computer-implemented method according to claim 6, wherein the determining related information of common data based on the element index comprises:
determining corresponding second data in the second data set as noise-added common data based on the element index.

13. The computer-implemented method according to claim 12, wherein the determining related information of common data based on the element index further comprises:
obtaining an attribute feature of each object corresponding to the noise-added common data; and
determining, based on the attribute feature of each object, a noise-added statistical result of the common data related to the attribute feature.

14. The computer-implemented method according to claim 13, wherein the noise-added statistical result comprises one of an average, a distribution, a total, or a mean square error.

15. A computer-implemented method for protecting privacy, comprising:
encrypting, by a first party by using a first key, each piece of first data in a first data set held by the first party to obtain a first single-encrypted full data set;
sending, by the first party, the first single-encrypted full data set to a second party;
at least re-encrypting, by the second party, each piece of data in the first single-encrypted full data set by using a second key to obtain a first double-encrypted full data set;
performing, by the second party, first sampling and single-encryption based on the second key based on a second data set held by the second party to obtain a second single-encrypted sampling data set;
sending, by the second party, the first double-encrypted full data set and the second single-encrypted sampling data set to the first party;
encrypting, by the first party, the second single-encrypted sampling data set by using the first key to obtain a second double-encrypted sampling data set;

determining, by the first party, an intersection of the first double-encrypted full data set and the second double-encrypted sampling data set as an original intersection;

performing, by the first party, second sampling on a complement other than the original intersection in the second double-encrypted sampling data set to obtain one or more obtained additional elements;

adding, by the first party, the one or more obtained additional elements to the original intersection to obtain a noise-added intersection;

sending, by the first party, an element index of the noise-added intersection to the second party; and determining, by the second party, related information of common data based on the element index.

16. The computer-implemented method according to claim 15, wherein the performing, by the first party, second sampling comprises:

performing sampling on one or more elements in the complement based on a second probability, wherein the second probability is negatively correlated with a predetermined second privacy budget.

17. The computer-implemented method according to claim 15, wherein the first double-encrypted full data set is obtained by disordering and re-encrypting based on the first single-encrypted full data set.

18. The computer-implemented method according to claim 15, wherein the first double-encrypted full data set is obtained by operations comprising:

disordering each piece of data in the first single-encrypted full data set, and re-encrypting each piece of disordered data by using the second key; or re-encrypting each piece of data in the first single-encrypted full data set by using the second key, and disordering re-encrypted data.

19. The computer-implemented method according to claim 15, wherein the second single-encrypted sampling data set is obtained by operations comprising:

performing first sampling on the second data set held by the second party, and applying single-encryption based on the second key to a sampling data set obtained through first sampling; or applying single-encryption based on the second key to each piece of second data in the second data set held by the second party, and performing first sampling on a second single-encrypted data set obtained through single-encryption.

20. The computer-implemented method according to claim 15, wherein the performing, by the second party, first sampling comprises:

for each element in a target set to be sampled, reserving the element as a sampling element based on a first probability, wherein the first probability is positively correlated with a predetermined first privacy budget.

* * * * *